United States Patent [19]
Stenberg

[11] 4,041,758
[45] Aug. 16, 1977

[54] LINEAR RESPONSE FLOW METER
[75] Inventor: Nyyrikki K. Stenberg, Roslyn, Pa.
[73] Assignee: Dart Industries, Inc., Los Angeles, Calif.
[21] Appl. No.: 644,016
[22] Filed: Dec. 24, 1975

Related U.S. Application Data
[63] Continuation-in-part of Ser. No. 470,784, May 17, 1974, Pat. No. 3,964,310.

[51] Int. Cl.² ............................................. G01F 1/22
[52] U.S. Cl. ........................................ 73/207; 73/209
[58] Field of Search ................. 73/207, 208, 209, 210, 73/408

[56] References Cited
U.S. PATENT DOCUMENTS

| 409,087 | 8/1889 | Williams | 73/408 |
|---|---|---|---|
| 1,416,220 | 5/1922 | Long et al. | 73/210 |
| 2,542,905 | 2/1951 | Cromer et al. | 73/408 X |
| 2,634,747 | 4/1953 | Markson | 73/398 X |
| 2,955,465 | 10/1960 | Delaney | 73/207 |
| 3,218,853 | 11/1965 | Ongaro | 73/208 |

FOREIGN PATENT DOCUMENTS

| 1,132,769 | 11/1956 | France | 73/210 |
| 44-31052 | 9/1966 | Japan | 73/210 |

Primary Examiner—Richard C. Queisser
Assistant Examiner—John P. Beauchamp
Attorney, Agent, or Firm—Arthur S. Collins; Bryant W. Brennan; Fred S. Valles

[57] ABSTRACT

A fluid flow meter of the variable area flow passage type is provided wherein the variation in said flow passage area is effected by the vertical displacement of a control boundary which is supported by a substantially horizontal annular diaphragm element. Said control boundary is shaped and sized so that the overall displacement required for the flow rate range desired is within the stroke capacity delivered by the total, up and down, free flexing action of said diaphragm element, thereby achieving substantially constant differential pressure operation at a very reasonable value which is due almost entirely to gravity. The resulting unit is very compact and stable and is characterized by very smooth linear response between vertical displacement and fluid flow rate. Said vertical displacement can be measured by various means but is preferably transduced to an equally linear, smooth and steady electrical signal by a direct connection with a specially adapted differential transformer.

16 Claims, 7 Drawing Figures

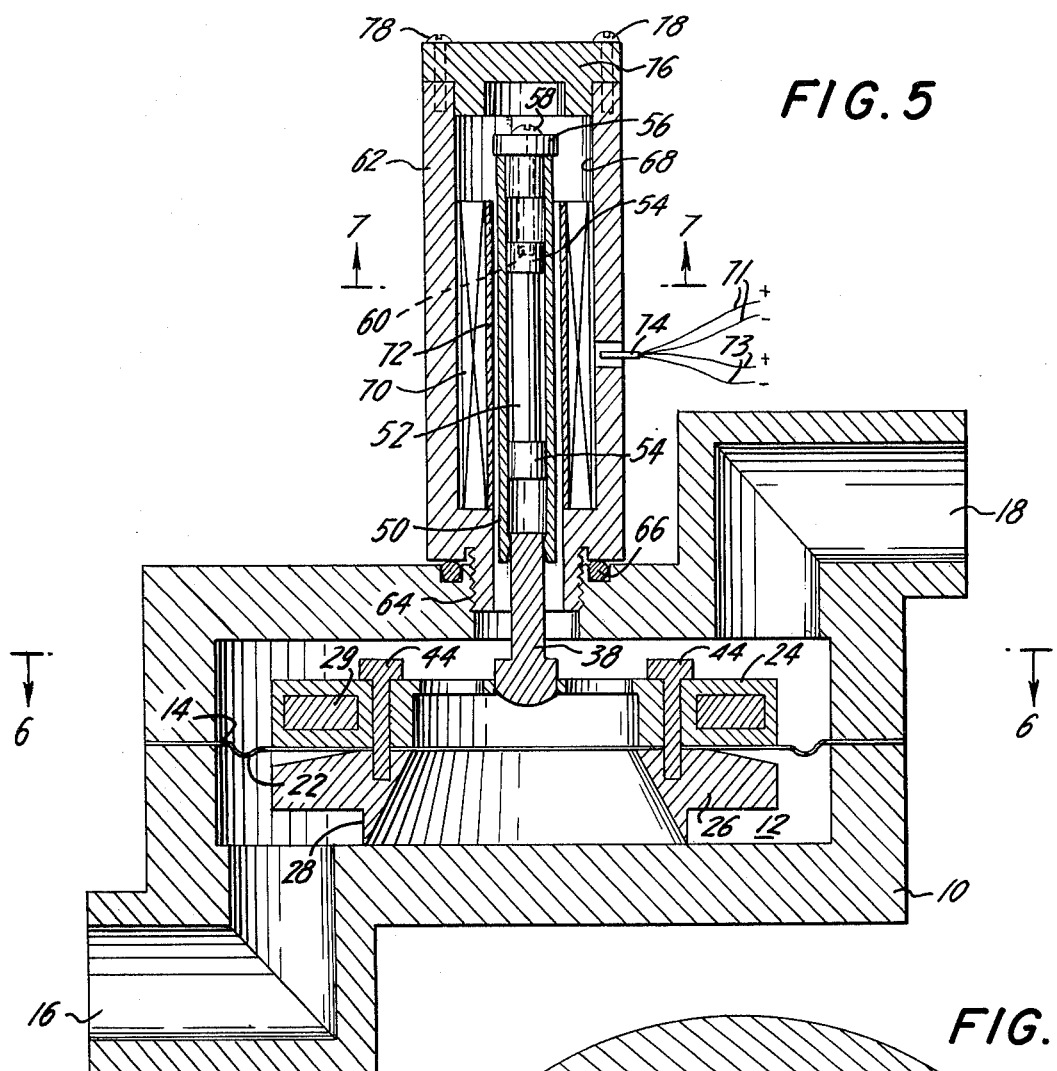
FIG.5
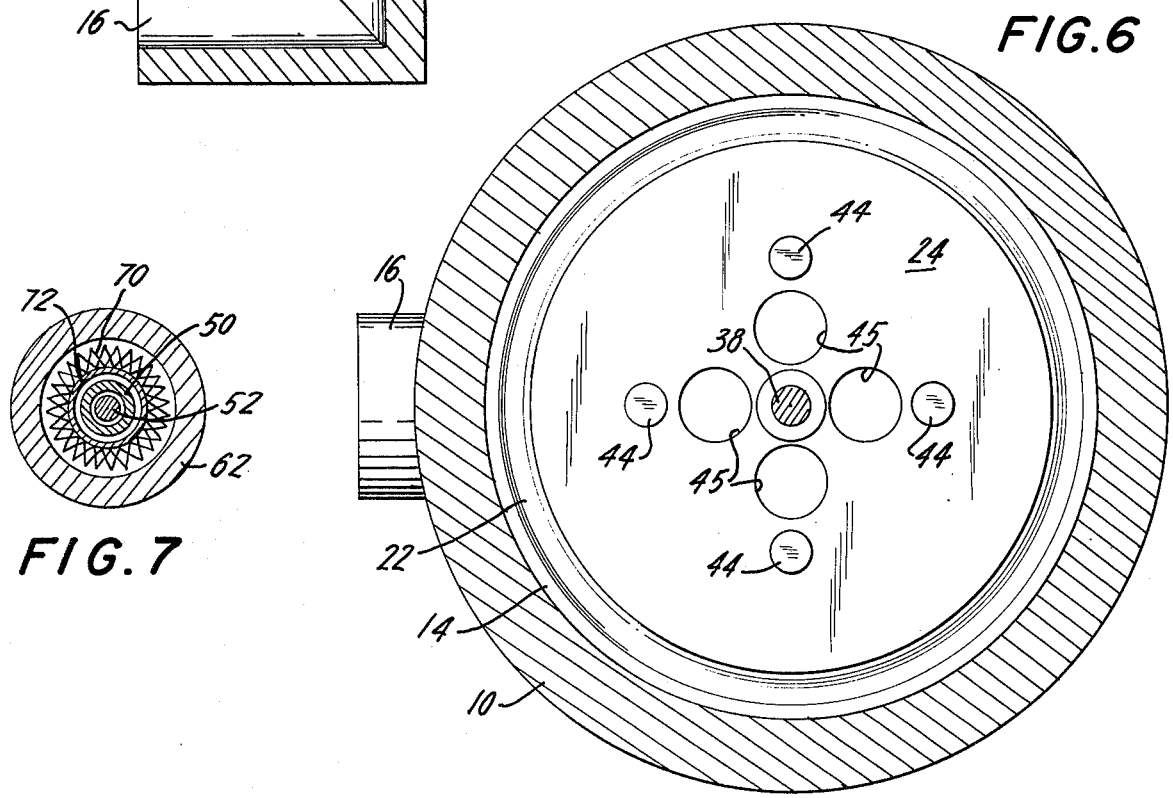
FIG.6
FIG.7

LINEAR RESPONSE FLOW METER

This is a continuation-in-part of pending application Ser. No. 470,784, filed May 17, 1974, now U.S. Pat. No. 3,964,310.

BACKGROUND OF THE INVENTION

This invention relates to fluid flow meters of the constant differential pressure type wherein a movable element is provided which, in automatic response to changes in fluid flow rate, effects corresponding changes in cross-sectional area of the minimum flow passage thereof. The flow meter of my invention is especially adapted for accurately measuring gas flows over a wide range of rates while maintaining a highly linear relationship which can be extended readily to a cooperative electrically transduced indicator system of closely matched linear responsiveness, if desired.

Over the years considerable effort has been directed toward improving variable area type flow meters to make them more stable and reliable and more nearly linear and accurate over a wide range of flow rates. One of the most common forms of apparatus developed in this field is the so-called rotameter, a device in which a generally roundish float element is lifted inside of an upwardly expanding tapered tube to heights directly dependent upon the fluid flow rates therethrough. Due to their simplicity and responsiveness, rotameters are very popular but are too fragile and erratic for many applications due to such problems as float bounce, mechanical resonance and uncertain or variable alignments.

Most of the more rugged variable area flow meters developed to date have movable elements which are either inherently stiff or separately spring biased, or else encumbered with sufficient frictional effects to dampen their responsiveness and prevent true linearity of the position vs. flow rate relationship. Examples of this type of flow meter in which the movable element is deliberately counterbiased with a back up spring are disclosed in U.S. Pat. No. 3,234,790 to Ekstrom and U.S. Pat. No. 1,416,220 to Long et al. On the other hand, Ongaro in U.S. Pat. No. 3,218,853 has advocated the use of a primarily gravity opposed movable element in such flow meters provided said movable element is vertically aligned. However, said patentee also points out the extreme difficulty of eliminating mechanical interferences and frictional resistances in any such device which is capable of durable service over a reasonable range of operating conditions.

The primary object of this present invention is to provide an essentially constant differential pressure, variable area flow metering device in which the movable element is truly gravity opposed and mechanical friction is effectively eliminated thereby achieving a very smooth linear response between fluid flow rate and displacement of the movable element. It is further object of my invention to provide such a device which is durable and can be used continuosly and/or repeatedly to deliver a smoothly linear and unchanging mechanical response to flow rates varying over a wide range (e.g. 10/1 or higher ratios). It is also one of my objects to povide such an apparatus which is compact and simple to use and operate.

A secondary object of this invention is to provide a directly coupled electric transducer which has a smoothly linear output closely matched to the mechanical displacement of the movable element in the variable area metering device over its full operating stroke. Finally, it is a special object of my invention to provide throughout my apparatus the capability of using corrosion resistant materials of construction so that it can be used to measure the flow rates of such aggressive gases as chlorine, oxides of nitrogen or sulfur, anhydrous ammonia etc.

Further objects and advantages of this invention will be apparent from the following description including exemplary and preferred embodiments as illustrated in the accompanying drawings, wherein:

FIG. 5 is a cross-sectional elevation along the center line of another embodiment of my invention in which a preferred type of electrical transducer is cooperatively integrated with the basic mechanical elements of the flow meter;

FIG. 6 is a top sectional view taken along line 6—6 of FIG. 5; and

FIG. 7 is a sectional view taken in the opposite direction along line 7—7 of FIG. 5.

Figure 1:
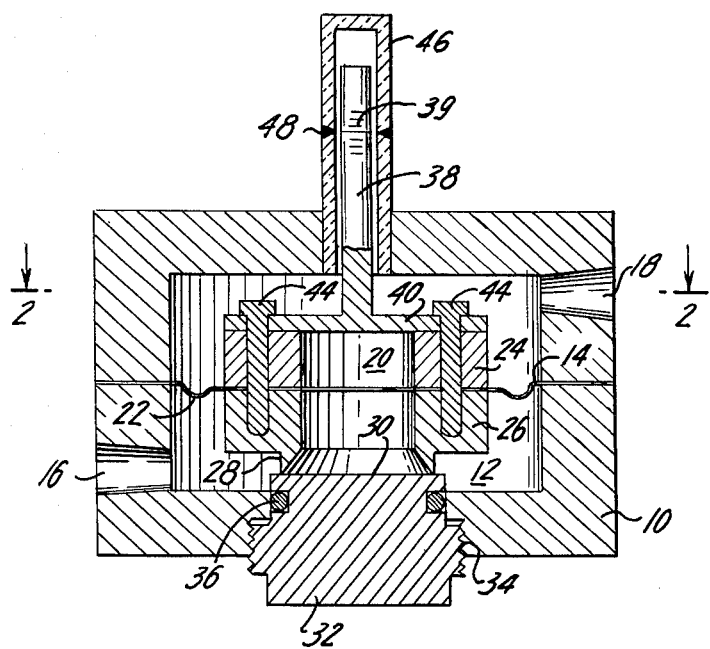
FIG. 1 is a cross-scetional elevation along the center line of a basic flow meter constructed in accordance with the present invention.
Figure 2:
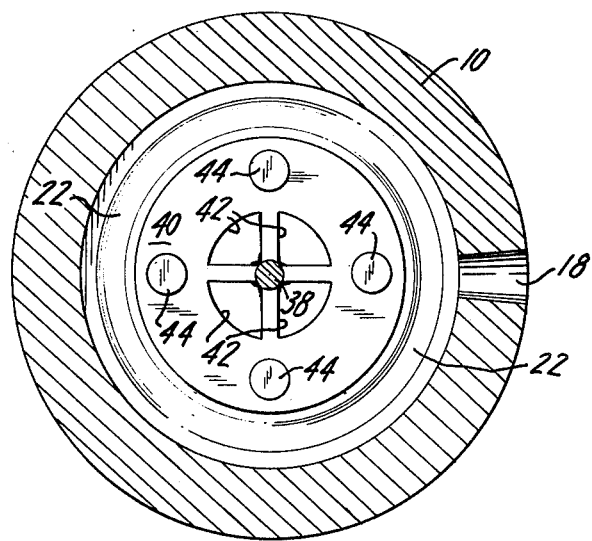
FIG. 2 is a top sectional view taken along line 2—2 of FIG. 1.

Referring now in detail to FIGS. 1 and 2, the main housing 10 of the meter encloses a generally cylindrical space 12 which is trasversely separated into upper and lower portions by means of thin, free flexing partition member or flexible diaphragm 14. The housing 10 is also provided with fluid inlet opening 16 into the lower portion of space 12 and fluid outlet passage 18 from the upper portion of space 12.

A large opening 12 is provided in the central area of partitioning diaphragm 14 in order to permit fluid to pass from lower to upper sections of space 12. Also, concentric convolution 22 is formed in the outer portion of diaphragm 14 in order to assure sufficient mechanically unrestrained up and down movement of the inner portions thereof to give measurable changes in vertical position which are accurately indicative of variations in fluid flow over useful ranges, such as maximum to minimum ratios of about 10/1.

Concentrically mounted on diaphragm 14 to the inside of convolution 22 are relatively thick blocks or plate members 24 and 26 the central areas of which are also open so as not to interfere with the flow of fluid up through opening 20. The lowest part of lower plate member 26 is shaped in the form of a downwardly extending concentric collar or rim 28. This rim 28 is tapered to a precise uniform thin edge at the bottom in order to provide part of the limiting surface for the controlling fluid flow passage of the meter. The opposing surface for the limiting or controlling flow passage is provided by the horizontal upper face 30 of plug 32 which is mounted in the base of housing 10 by means of threaded opening 34 using a sealing O-ring element 36 so that upper face 30 just contacts the lower edge of rim 28 under stress free, gravity induced deflection of diaphragm 14 from its neutral position. It will be seen that the controlling flow passage thus defined between rim 28 and plug face 30 takes the form of a cylindrically shaped slot, the depth and cross-sectional area of which will increase in direct correspondence with the upward travel of plates 24 and 26 which is permitted without mechanical restraint by reversing the downward deflection of diaphragm 14 back to its neutral position and beyond into its stress-free upwardly deflected shape.

A vertical position indicator rod or mast 38 is centrally mounted on the topside of upper plate member 24 by means of bridge plate 40. Bridge plate 40 has fluid passage openings 42 in the central area thereof and the entire diaphragm and plate assembly is held together by bolts 44. Indicator mast 38 extends up into the free space inside of transparent extension cover 46 sealably mounted in the head of main housing 10. Suitable gradations 39 are engraved on the portion of mast 38 which are visible through extension cover 46 so that the vertical position can be read relative to a bench mark 48.

Since no counterbiasing springs are used in my flow meter and the total stroke is within the movement permitted by the free up and down flexure of diaphragm 14, the only significant force opposing the flow fo fluid therethrough is the gravitiational pull on the mass of elements supported by diaphragm 14. Therefore, the differential pressure across a given meter of my construction will be substantially constant over a wide range of fluid flow rates. Said mass can be controlled to some extent by choice of materials, thickness of diaphragm plates 24 and 26 etc. However, limiting said differential pressure to a very reasonable value is generally easy because of the rather extensive effective area of the partitioning diaphragm assembly. This fact renders my devices ideal for measuring gas flows at low to ordinary pressures. Even under these sensitive conditions, a very smooth and steady linear response is achieved between the vertical movement of mast 38 and corresponding flow rates delivered through the meter.

Figure 3:
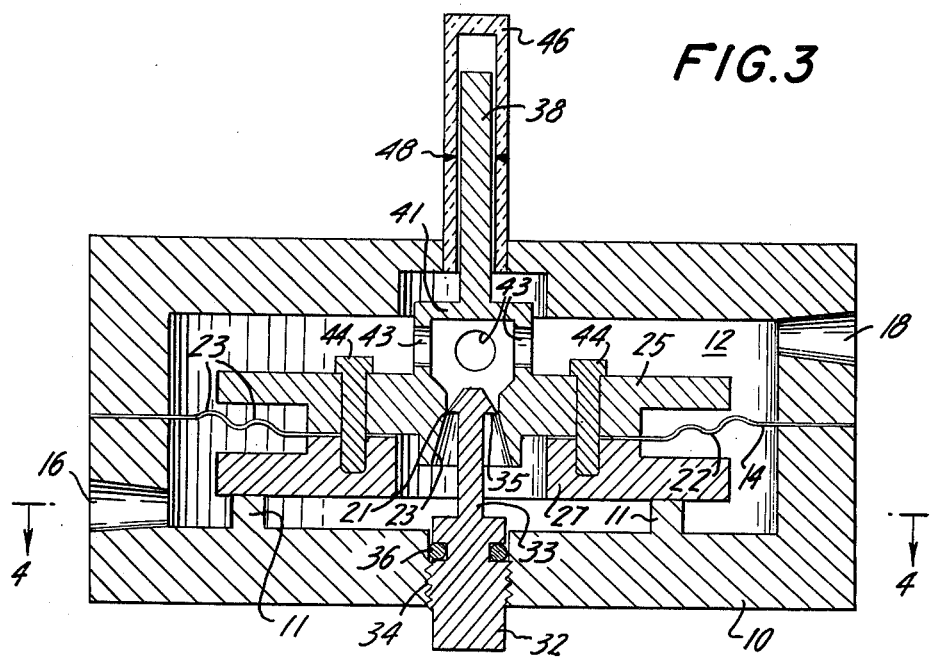
FIG. 3 is a cross-sectional elevation along the center line of another embodiment of flow meter operating on the same general principles and especially suited for measuring small flow rates.
Figure 4:
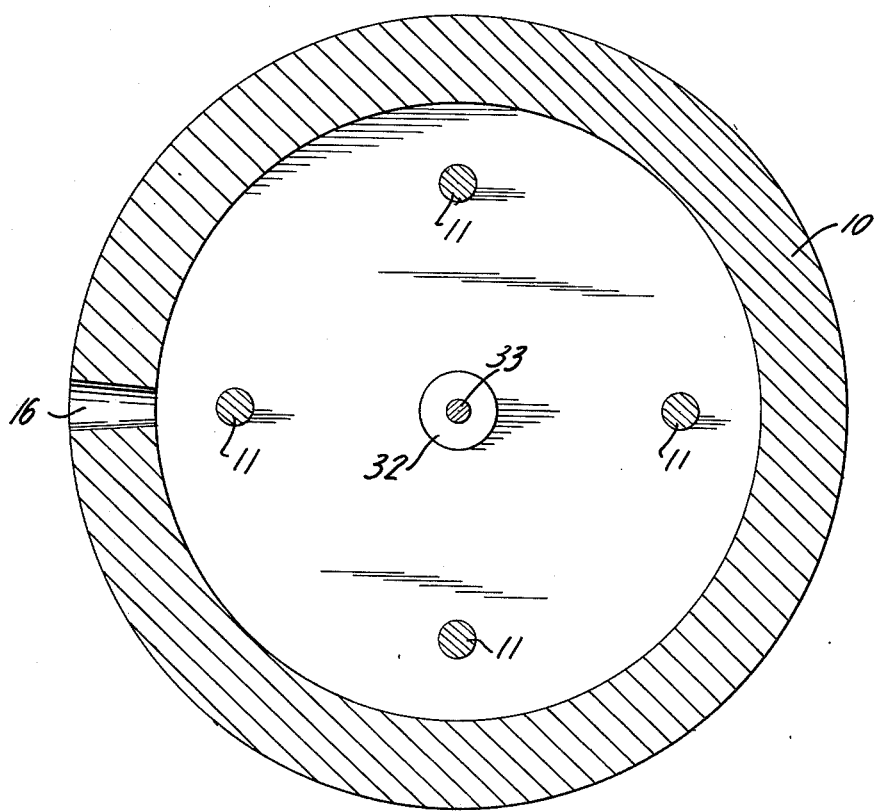
FIG. 4 is a top sectional view taken along line 4—4 of FIG. 3.

In FIGS. 3 and 4 there is depicted another embodiment of my invention based upon the same operating principle but illustrating some optional constructional features of specific interest. In this embodiment, the limiting or controlling flow passage is defined at a position well within the vertical opening through the diaphragm plate assembly instead of at the lower rim of the lower plate member as in the previously described construction. Specifically, in this case, the opening through upper diaphragm plate 25 is smaller than the central openings through diaphragm 14 and lower plate 27 and is shaped as a precisely tapered, upwardly converging frustoconical section 23 leading to throat section 21 and then diverging rapidly at the top. Cooperatively aligned with said opening is plug 32 mounted in the base of housing 10. Concentric extension post 33 on plug 32 extends vertically up through frustoconical section 23 and is provided with horizontal shoulder 35 tapered on top so that a thin edged outer rim is formed thereon the outside diameter of which is slightly greater than the diameter of throat section 21. Thus, the limiting flow passage in this device is in the form of an annular slot which gradually increases in width in direct proportion to the upward travel of the inner portion of diaphragm 14 under the lifting force of the flowing fluid.

Also, in this case downwardly concave concentric convolutions 23 are provided on either side of upwardly concave convolution 22 in diaphragm 14 in order to ensure a somewhat larger mechanically unrestrained vertical movement or permissible total stroke of the indicator mast 38. The mast 38 of this unit is mounted on top of upper plate 25 by means of concentric, inverted cup shape bracket 41 having large fluid outlet passages 43 in each lateral quadrant thereof. Four matching lugs 11 of equal height are provided on the inner floor of housing 10 providing uniform support for the diaphragm plate assembly under static conditions while still permitting light contact of the rim of shoulder 35 with the inner surface of frustoconical section 23. Tests of devices constructed in accordance with FIGS. 3 and 4 have also shown fully linear responsiveness. Also, because of the larger stroke provided, reading the indicator to a given degree of accuracy generally requires less effort.

Attention is next directed to FIGS. 5, 6, 7 wherein there is illustrated the integration of the mechanical features of the present invention with an electrical transducer system of matched linearity so that the mechanical motion of the indicator rod is translated directly into a linearly responsive electrical signal which is more easily and accurately detected, read and/or recorded. Although the mechanical arrangements and actions of this embodiment are quite similar to those of FIGS. 1 and 2, a few minor modifications should be noted. First, in order to provide for larger fluid flow capacities, the diameter of the thin edged control surface of rim 28 is made considerably greater and the horizontal floor of main housing 10 itself serves as the opposing surface of the cylindrical slot under rim 28 which constitutes the limiting flow passage. Secondly, the upper face of the lower diaphragm plate 26 is cut away slightly beginning from a short distance outside the ring of assembly bolts 44 and tapering downward to its outer edge, thus taking better advantage of the flexibility of the larger diameter diaphragm 14 to obtain a longer stress-free and mechanically uninhibited vertical stroke while incorporating only one convolution 22 in the diaphragm 14. Also, in order to adjust the differential pressure of this unit to the desired value, a ring of material 29 of different density is built into upper diaphragm plate 24. For example, ring 29 could be a lead insert or the like molded into a plastic plate 24, e.g. of polyvinyl chloride composition.

Finally, the mast 38 on top of the diaphragm plate assembly in this device serves as a connecting rod transmitting the vertical motion of said assembly to the iron core of a linearly variable differential transformer which is the preferred form of electrical transducer for my flow meter. Thus, the upper end of mast 38 is rigidly connected into the lower end of thin-walled sheath tube 50 within which iron core 52 is carried by means of concentric spacer caps 54 at either end. The upper end of sheath tube 50 is sealed by means of plug 56 through which adjusting screw 58 entends and threadably connects into a tapped opening 60 in upper spacer cap 54 in order to simplify final setting of the vertical position of iron core 52. These parts associated with iron core 52 (such as 50, 54, 56, and 58) should be constructed of materials of relatively low magnetic permeability so as not to affect the armature action of said iron core. Plastic materials such as nylon, polyolefins, fluoroplastics and the like are ideal for this purpose but various metals like tantalum and non-magnetic stainless steels can also be used.

The outer housing 62 of the differential transformer is provided with a threaded connection 64 for mounting same on top of main housing 10 and a cooperating O-ring element 66 to insure a fluid tight seal therebetween. Threaded connection 64 has an internal bore somewhat larger than the outside diameter of sheath tube 50 so as to permit free vertical movement of same therethrough. The main body of housing 62 encloses bore or cylindrical well 68 which is sized to accept coil assembly 70 which has an inner core 72 of larger diameter than sheath tube 50 so that it can be positioned around same with the electrical leads 71 and 73 passing out the side of housing 62 through opening 74. After all of the parts of the differential transformer are in place, the top of housing 62 can be closed by means of seal cap 76 with the aid of screws 78.

Coil assembly 70 contains a primary winding and at least one secondary coil. Preferably, two secondary coils of the same configuration are wound on core 72 equidistantly above and below the center point thereof or a uniformly wound secondary coil is center-tapped dividing it electrically into upper and lower sections. In this way when an alternating current is passed through the primary coil by means of leads 71, the inductance effect in the secondary will be doubled due to the push-pull effect of iron core 52. In other words, if the center of iron core 52 is properly adjusted so as to line up opposite the center point of coil assembly 70 when the diaphragm assembly is at its lowest downwardly deflected position (zero fluid flow), then the induction effect in the opposing secondary coil sections will be exactly balanced and the electrical output through leads 73 will be zero. However, as the iron core 52 is lifted from this null position vertically up through the coil assembly, the decrease in inductance in the lower secondary section will be of the same magnitude as the increase in the upper secondary so that an additive or doubled net electrical signal is emitted through leads 73, thus insuring a strong, steady and accurate read-out signal with excellent linearity matching that of the mechanical stroke produced by the diaphragm assembly as it responds to the fluid flow rate through the unit. Excellent units of this type can be built to operate on a very compact overall maximum mechanical stroke, e.g. a minor fraction of an inch.

One of the prime fields of use for the highly sensitive and linearly responsive flow meter of this invention if for measuring the flow of chlorine gas in various chlorination systems, wherein the feed pressures employed are often below normal atmospheric pressure. Excellent performance has been experienced in this service provided the parts which are subject to contact with the chlorine gas are constructed of suitable materials which include fluorinated polymers, polyvinylchloride, acrylonitrilebutadienestyrene copolymers, and the like or metals such as tantalum or silver.

For example, polymers based upon chlorotrifluoroethylene have excellent properties. Thus, 5 mil thick sheeting of one such polymer sold under the registered Trade Mark "Kel-F" has been used with excellent results to fabricate the flexible annular diaphragms 14 used in the flow meters described hereinabove. In molding the concentric convolutions in these diaphragms, it has been found desirable to produce very gently rounded contours and to limit the depth of groove to no more than about half the main contour radius thereof.

Similar materials including elastomeric fluoropolymers such as those sold under the registered Trade mark "Viton" can be used for O-ring elements 36 and 66.

As will be obvious to those skilled in the art, many different substitutions and modifications can be made in specific elements of the invention described hereinabove. For example, any suitable level indicating device, whether mechanical, electrical, magnetic, electronic etc. can be used to determine the vertical displacement of the movable element of the limiting fluid flow control passage of the unit.

Having described my invention together with preferred embodiments thereof, what is claimed is:

1. A fluid flow measuring device characterized by a highly linear response and a substantially constant differential pressure operation comprising a main casing; a substantially horizontal partition member peripherally attached to the lateral walls of said casing in a fluid tight manner, said partition member having a large open area in the middle thereof and being sufficiently flexible to present negligible resistance to measurable vertical motion of its central portion in both directions from the horizontal; a fluid inlet into said casing below the level of said peripheral attachment of said partition member and a fluid outlet from said casing above said level; a rigid, symmetrically shaped fluid flow control element symmetrically mounted on the central portion of said partition member; rigidly mounted on said casing in uniform directly opposed alignment beneath said element a cooperatively designed fluid flow control element positioned so that it is substantially below the upper control element when said partition member is horizontal but within full contact reach of same upon deflection of the central portion of said partition as permitted by its said negligible resistance motion capability; and means for measuring said vertical motion upwards from the point of contact between the respective fluid flow control elements.

2. The device of claim 1 wherein said means comprises an indicator rod rigidly mounted from said partition member.

3. The device of claim 2 wherein said indicator rod extends beyond the main casing and an auxiliary enclosure is provided on said casing at that point having means thereon for visually determining vertical positioning of said rod.

4. The device of claim 2 wherein an electrical transducer or signalling device is provided immediately outside of said main casing and said indicator rod is coupled to said transducer or device.

5. The device of claim 4 wherein said transducer is a differential transformer and said indicator rod is rigidly connected to the core of said transformer.

6. The device of claim 1 wherein said partition member comprises a thin diaphragm.

7. The device of claim 6 wherein said diaphragm has at least one concentric convolution formed in the outer portion thereof and said partition member also includes thick heavy annular plate members mounted on either side of said diaphragm between said concentric convolution and the open area in the middle thereof.

8. The device of claim 7 wherein said measuring means comprises an indicator rod rigidly mounted concentrically from said partition member by means of a rigid connection to one of said plate members.

9. A rugged, compact flow meter of the variable area orifice type which is especially suited for accurately measuring the flow rates of gases at low pressures due to its highly linear response characteristics and constant differential pressure over widely varying flow rates comprising a main casing; a substantially horizontal diaphragm extending from the lateral walls of said casing and having a large non-controlling open area in the central portion thereof, thus partitioning said casing into an upper and a lower section with intercommunication therebetween solely via said open area, the central portion of said diaphragm being capable of limited but measurable stress free motion both above and below the horizontal; a fluid inlet into said lower section and a fluid outlet from said upper section; at least one relatively heavy annular plate member concentrically mounted on said diaphragm and having a rigid, symmetrically shaped fluid flow control element thereon in fluid tight communication with said open area; rigidly mounted on the floor of said casing in uniform symmetrical alignment with and subadjacent to said control element, a directly opposed fluid flow control element positioned so that said opposed fluid flow conrol elements contact each other at a point when the central portion of said diaphragm is deflected downwards a substantial distance within the limit of its stress free motion; and means for determining the vertical displacement of said central portion upwardly from said point of contact.

10. A flow meter as described in claim 9 wherein said diaphragm has at least one concentric convolution in the outer portion thereof.

11. A flow meter as described in claim 9 wherein said means comprises a vertical, rigid indicator rod supported from said diaphragm-mounted heavy plate member.

12. A flow meter as described in claim 11 wherein said indicator rod extends beyond the main casing and an auxiliary enclosure is provided on said casing at that point having means thereon for visually determining said vertical displacement of said central portion.

13. A flow meter as described in claim 11 wherein a differential transformer type of electrical transducer having an iron core is provided immediately outside of said main casing and said indicator rod is connected to said iron core.

14. A flow meter as described in claim 13 wherein said differential transformer has a dual secondary winding providing a push-pull type of reinforced electrical signal in response to vertical displacement of said iron core from its null or no flow position.

15. The flow meter of claim 9 wherein said fluid flow control element on said plate member is in the form of a collar or rim extending downwardly from the bottom portion of said member.

16. The flow meter of claim 15 wherein said downwardly extending collar or rim tapers to a uniform thin edge at the bottom.

* * * * *

UNITED STATES PATENT AND TRADEMARK OFFICE
CERTIFICATE OF CORRECTION

PATENT NO. : 4,041,758
DATED : August 16, 1977
INVENTOR(S) : Nyyrikki K. Stenberg It is certified that error appears in the above-identified patent and that said Letters Patent are hereby corrected as shown below:

Please correct the following as shown below:

Column 2, line 34 - add "n" in "trasversely" to read "transversely"

Column 2, line 40 - change "12" to "20"

Signed and Sealed this

Twenty-seventh Day of December 1977

[SEAL]

Attest:

RUTH C. MASON
*Attesting Officer*

LUTRELLE F. PARKER
*Acting Commissioner of Patents and Trademarks*